United States Patent
Chen et al.

(10) Patent No.: US 9,990,686 B2
(45) Date of Patent: Jun. 5, 2018

(54) METHOD FOR GENERATING A DATA-BEARING HALFTONE IMAGE, AND METHOD FOR DECODING THE DATA-BEARING HALFTONE IMAGE

(71) Applicant: NATIONAL TAIPEI UNIVERSITY OF TECHNOLOGY, Taipei (TW)

(72) Inventors: Yung-Yao Chen, Taipei (TW); Kuan-Yu Chi, Taipei (TW); Po-Han Chen, Taipei (TW); Wei-Sheng Chen, Taipei (TW); Kai-Wen Chen, Taipei (TW)

(73) Assignee: NATIONAL TAIPEI UNIVERSITY OF TECHNOLOGY, Taipei (TW)

(*) Notice: Subject to any disclaimer, the term of this patent is extended or adjusted under 35 U.S.C. 154(b) by 176 days.

(21) Appl. No.: 15/147,923

(22) Filed: May 6, 2016

(65) Prior Publication Data
US 2017/0109857 A1 Apr. 20, 2017

(30) Foreign Application Priority Data

Oct. 16, 2015 (TW) .............................. 104134062 A
Oct. 16, 2015 (TW) .............................. 104134064 A

(51) Int. Cl.
*G06T 1/00* (2006.01)
*G09G 3/20* (2006.01)
*H04N 1/405* (2006.01)

(52) U.S. Cl.
CPC ......... *G06T 1/0021* (2013.01); *G09G 3/2051* (2013.01); *H04N 1/405* (2013.01); *H04N 1/4051* (2013.01)

(58) Field of Classification Search
CPC .... G06T 1/0021; H04N 1/405; H04N 1/4051; H04N 1/4052; H04N 1/4055; G09G 3/2051
See application file for complete search history.

(56) References Cited

U.S. PATENT DOCUMENTS

| | | | | |
|---|---|---|---|---|
| 8,284,987 B2 * | 10/2012 | Ulichney | ........... | H04N 1/32219 382/100 |
| 8,456,699 B2 * | 6/2013 | Ulichney | ............ | H04N 1/4055 358/1.9 |
| 8,594,453 B2 | 11/2013 | Gaubatz et al. | | |

OTHER PUBLICATIONS

Lieberman, et al., "A Dual Interpretation for Direct Binary Search and Its Implications for Tone Reproduction and Texture Quality," IEEE Transactions on Image Processing, vol. 9, No. 11, pp. 1950-1963, Nov. 2000.

(Continued)

*Primary Examiner* — Jon Chang
(74) *Attorney, Agent, or Firm* — Nixon & Vanderhye P.C.

(57) ABSTRACT

A method for generating a data-bearing image is implemented by an encoding system including a halftoning module and an encoding module that stores encoding rules associated with respective codes. In the method, the halftoning module converts a grayscale image into a halftone image having a plurality of image cells each consisting of a plurality of dots, at least one of which is a first-tone dot and each of the rest of which is a second-tone dot. Afterward, the encoding module generates a data-bearing halftone image encoded with at least one of the codes by maintaining or changing the number of the first-tone dots in one of the image cells based on one of the encoding rules associated with the at least one of the codes.

6 Claims, 16 Drawing Sheets

(56) References Cited

OTHER PUBLICATIONS

Wu, et al., "Data Hiding in Halftone Images with Homogeneous Distribution of Embedding Positions," Optical Engineering, vol. 51(3), pp. 037005-1 to 037005-12, Mar. 2012.
Fu, et al., "Data Hiding Watermarking for Halftone Images," IEEE Transactions on Image Processing, vol. 11, No. 4, pp. 477-484, Apr. 2002.

* cited by examiner

| 232 | 136 | 104 | 248 |
|-----|-----|-----|-----|
| 88  | 24  | 40  | 184 |
| 152 | 8   | 56  | 120 |
| 216 | 72  | 168 | 200 | predetermined threshold matrix using clustered-dot ordered dithering

| 56  | 120 | 152 | 8   |
|-----|-----|-----|-----|
| 168 | 200 | 216 | 72  |
| 104 | 248 | 232 | 136 |
| 40  | 284 | 88  | 24  | predetermined threshold matrix using dispersed-dot ordered dithering

FIG.3

| 0 0 0 0 = 0 | 0 0 0 1 = 1 | 0 0 1 0 = 2 | 0 0 1 1 = 3 |
|---|---|---|---|
| $\begin{array}{\|c\|c\|}\hline 0 & 0 \\\hline 0 & 0 \\\hline\end{array}$ | $\begin{array}{\|c\|c\|}\hline +1 & -1 \\\hline 0 & 0 \\\hline\end{array}$ | $\begin{array}{\|c\|c\|}\hline -1 & +1 \\\hline 0 & 0 \\\hline\end{array}$ | $\begin{array}{\|c\|c\|}\hline 0 & 0 \\\hline +1 & -1 \\\hline\end{array}$ |

| 0 1 0 0 = 4 | 0 1 0 1 = 5 | 0 1 1 0 = 6 | 0 1 1 1 = 7 |
|---|---|---|---|
| $\begin{array}{\|c\|c\|}\hline 0 & 0 \\\hline -1 & +1 \\\hline\end{array}$ | $\begin{array}{\|c\|c\|}\hline +1 & 0 \\\hline 0 & -1 \\\hline\end{array}$ | $\begin{array}{\|c\|c\|}\hline -1 & 0 \\\hline 0 & +1 \\\hline\end{array}$ | $\begin{array}{\|c\|c\|}\hline 0 & +1 \\\hline -1 & 0 \\\hline\end{array}$ |

| 1 0 0 0 = 8 | 1 0 0 1 = 9 | 1 0 1 0 = 10 | 1 0 1 1 = 11 |
|---|---|---|---|
| $\begin{array}{\|c\|c\|}\hline 0 & -1 \\\hline +1 & 0 \\\hline\end{array}$ | $\begin{array}{\|c\|c\|}\hline 0 & +1 \\\hline 0 & -1 \\\hline\end{array}$ | $\begin{array}{\|c\|c\|}\hline 0 & -1 \\\hline 0 & +1 \\\hline\end{array}$ | $\begin{array}{\|c\|c\|}\hline +1 & 0 \\\hline -1 & 0 \\\hline\end{array}$ |

| 1 1 0 0 = 12 | 1 1 0 1 = 13 | 1 1 1 0 = 14 | 1 1 1 1 = 15 |
|---|---|---|---|
| $\begin{array}{\|c\|c\|}\hline -1 & 0 \\\hline +1 & 0 \\\hline\end{array}$ | $\begin{array}{\|c\|c\|}\hline +1 & -1 \\\hline -1 & +1 \\\hline\end{array}$ | $\begin{array}{\|c\|c\|}\hline -1 & +1 \\\hline +1 & -1 \\\hline\end{array}$ | $\begin{array}{\|c\|c\|}\hline -1 & -1 \\\hline +1 & +1 \\\hline\end{array}$ |

FIG.6

METHOD FOR GENERATING A DATA-BEARING HALFTONE IMAGE, AND METHOD FOR DECODING THE DATA-BEARING HALFTONE IMAGE

CROSS-REFERENCE TO RELATED APPLICATION

This application claims priorities of Taiwanese Patent Application No. 104134062 and Taiwanese Patent Application No. 104134064, both filed on Oct. 16, 2015.

FIELD

The disclosure relates to an encoding system and a decoding system, and more particularly to an encoding system and a decoding system that are capable of respectively generating a data-bearing halftone image, and decoding the data-bearing halftone image.

BACKGROUND

An anti-counterfeiting manner involves using steganography to conceal message (regarding the copyright) in the documents and images. For example, U.S. Pat. No. 8,594,453 discloses a conventional method for creating a data-bearing halftone image in the form of a stegatone (steganographic halftone).

As shown in FIG. 1, a cell of a grayscale image may be converted into a stegatone using one of the four stegatone cells 502, 504, 506 and 508. Each of the stegatone cells is associated with a binary code having two bits (e.g., '00', '01', '10' and '11'). As such, a message (e.g., a copyright claimer) in the form of a stream of binary codes may be represented by a series of stegatone cells which composes the data-bearing portion of the data-bearing halftone image.

However, the arrangements of the grayscale image using the stegatone cells are deliberately made. As a result, the quality of the generated data-bearing halftone image may be compromised.

Other documents related to the art include:

D. J. Lieberman and Jan P. Allebach, "A dual interpretation for direct binary search and its implications for tone reproduction and texture quality," IEEE Trans. Image Processing, Vol. 9, Issue 11, pp. 1950-1963, 2000. (doi:10.1109/83.877215);

Xiaotian Wu, Duanhao Ou, Juan Liu, and Wei Sun, "Data hiding in halftone images with homogeneous distribution of embedding positions," Optical Engineering, Vol. 51, Issue 3, pp. 1-13, 2012. (doi:10.1117/1.OE.51.3.037005); and Ming Sun Fu and O. C. Au, "Data hiding watermarking for halftone images," IEEE Trans. Image Processing, Vol. 11, Issue 4, pp. 477-484, 2002. (doi:10.1109/TIP.2002.999680).

SUMMARY

Therefore, an object of the disclosure is to provide a method for of generating a data-bearing halftone image that is encoded with a code, and that has a relatively better quality.

According to one embodiment of the disclosure, the method is implemented by an encoding system for generating a data-bearing halftone image. The encoding system includes a halftoning module and an encoding module. The encoding module stores a plurality of encoding rules associated with respective codes therein. The method includes the steps of:

converting, by the halftoning module, a grayscale image into a halftone image by screening the grayscale image using a predetermined threshold matrix that includes a plurality of grayscale threshold values, the halftone image having a plurality of image cells each corresponding to the predetermined threshold matrix in size, each of the image cells consisting of a plurality of dots, at least one of which is a first-tone dot and each of the rest of which is a second-tone dot; and generating, by the encoding module, a data-bearing halftone image that is encoded with at least one of the codes by maintaining or changing the number of the first-tone dots in one of the image cells according to one of the encoding rules that is associated with the at least one of the codes.

Another object of the disclosure is to provide a method for decoding the data-bearing halftone image encoded by the above-mentioned method.

According to one embodiment of the disclosure, the method is for decoding a data-bearing halftone image that is encoded with a code and that includes a plurality of image cells. Each of image cells consists of a plurality of dots, at least one of which is a first-tone dot and each of the rest of which is a second-tone dot. The method is implemented by a decoding that system includes a database, a halftoning module, and a decoding module.

The database stores therein a grayscale image that corresponds to the data-bearing halftone image, a predetermined threshold matrix that includes a plurality of grayscale threshold values, and a plurality of encoding rules associated with respective codes. The method includes the steps of:

converting, by the halftoning module, the grayscale image into a halftone image by screening the grayscale image using the predetermined threshold matrix, the halftone image having a plurality of image cells each corresponding to the predetermined threshold matrix in size; and decoding, by the decoding module, a data-bearing block of the data-bearing halftone image by identifying the data-bearing block of the data-bearing halftone image that corresponds in location to an encodable block in the halftone image, the data-bearing block including adjacent four of the image cells of the data-bearing halftone image, determining, between each of the image cells in the encodable block of the halftone image and a corresponding one of the image cells in the data-bearing block of the data-bearing halftone image, a difference of a number of first-tone dots contained therein, and determining the code represented by the data-bearing block of the data-bearing halftone image based on the plurality of sets of encoding rules, and on the difference of the number of first-tone dots between each of the image cells in the encodable block of the halftone image and corresponding one of the image cells in the data-bearing block of the data-bearing halftone image.

BRIEF DESCRIPTION OF THE DRAWINGS

Other features and advantages of the disclosure will become apparent in the following detailed description of the embodiments with reference to the accompanying drawings, of which:

FIG. 3 illustrates exemplary predetermined threshold matrices generated using clustered-dot ordered dithering and dispersed-dot ordered dithering, respectively;

FIG. 6 illustrates an exemplary set of encoding rules, each associated with a respective code;

DETAILED DESCRIPTION

Figure 1:
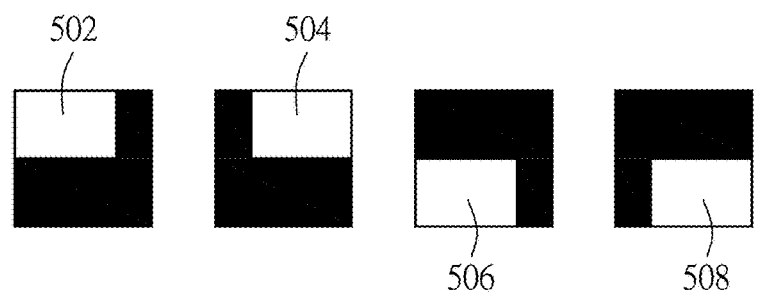
FIG. 1 illustrates a plurality of stegatone cells used in a conventional method for generating a data-bearing halftone image.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
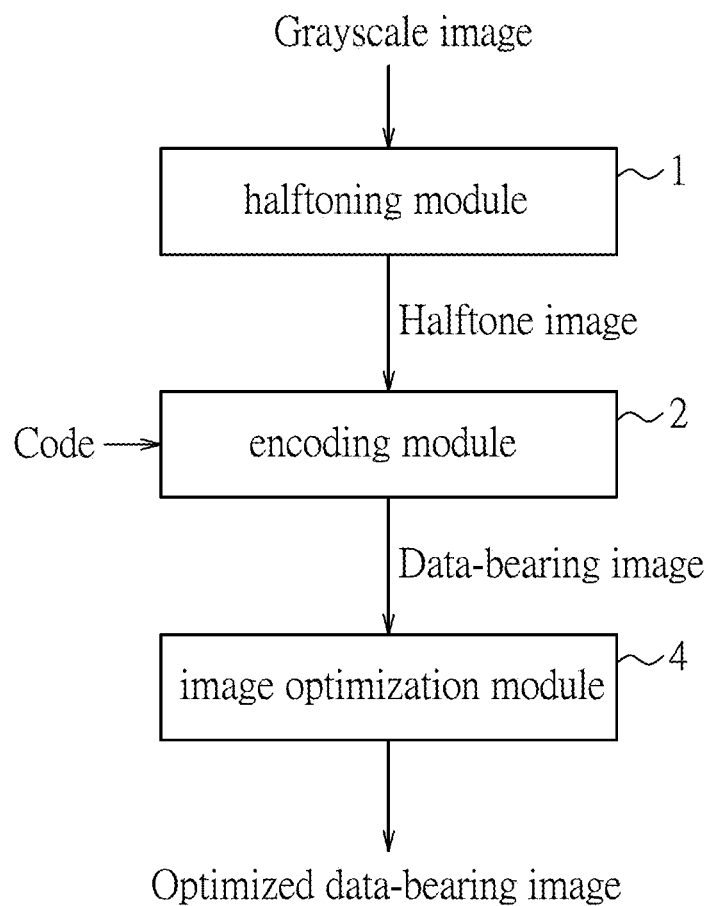
FIG. 2 is a block diagram illustrating an encoding system according to one embodiment of the disclosure.
Figure 4:
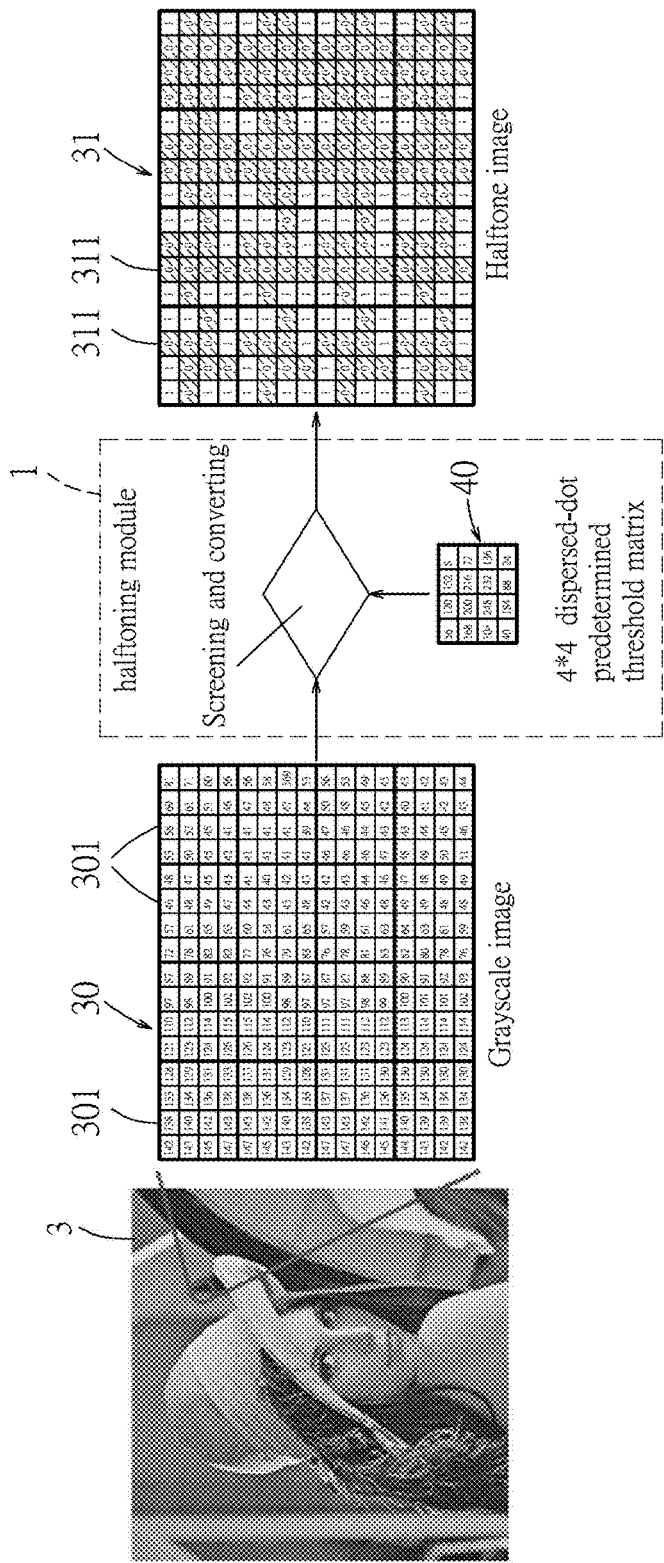
FIG. 4 illustrates operations of a halftoning module for converting a grayscale image into a halftone image.

FIG. 2 illustrates an encoding system according to an embodiment of the disclosure. The encoding system is configured to generate a data-bearing halftone image from a grayscale image 30 (as shown in FIG. 4). In this embodiment, the grayscale image 30 has a size of 16*16 pixels, and is extracted from a full grayscale image 3 (as shown in FIG. 4) that is to be encoded.

The encoding system includes a halftoning module 1 and an encoding module 2. In this embodiment, the encoding system may be embodied using a server computer that includes a processor, and the modules in the encoding system may be software applications that, when executed by the processor of the server computer, causes the processor to perform various functions that will be described below.

The halftoning module 1 stores a predetermined threshold matrix 40 (as shown in FIG. 4), and is configured to convert the grayscale image 30 into a halftone image 31.

Specifically, the term "halftone" refers to the technique that simulates continuous tone imagery using black dots and blanks. When a grayscale image is processed using the halftone technique, a halftone image is generated. When being apart from the halftone image by more than a sufficient distance, the halftone image may be perceived by the human eye as an image with continuous tone.

In this embodiment, the halftoning module 1 converts the grayscale image 30 into the halftone image 31 by screening the grayscale image 30 using the predetermined threshold matrix 40.

Specifically, the predetermined threshold matrix 40 is a square matrix generated using one of clustered-dot ordered dithering and dispersed-dot ordered dithering.

Exemplary threshold matrices generated respectively using the clustered-dot ordered dithering and the dispersed-dot ordered dithering are illustrated in FIG. 3.

In this embodiment, the predetermined threshold matrix 40 is generated using dispersed-dot ordered dithering, has a size of 4*4 elements, and is generated with reference to a screen tile vector set that consists of a pair of two-dimensional vectors.

The screen tile vector set is for determining a shape and a rotating angle of the predetermined threshold matrix 40. In this embodiment, the screen tile vector set is composed of two two-dimensional vectors [0,4] and [4,0], and has 4*4 grayscale threshold values.

Related documents regarding generation of the threshold matrix includes:

Jin-Young Kim, Yung-Yao Chen, Mani Fischer, Omri Shacham, Carl Staelin, Kurt Bengtson, and Jan P. Allebach, "Design of color screen tile vector sets," Proc. SPIE, Color Imaging XVI: Displaying, Processing, Hardcopy, and Applications, Vol. 78661C, pp. 1-12, 2011. (doi:10.1117/12.878658); and F. A. Baqai and Jan P. Allebach, "Computer-aided design of clustered-dot color screens based on a human visual system model," IEEE Trans. Image Processing, Vol. 90, Issue 1, pp. 104-122, 2002. (doi:10.1109/5.982409)

"Design of Color Screen Tile Vector Sets"; and

"Computer-aided Design of Clustered-dot Color Screens Based on a Human Visual System Model".

Referring to FIG. 4, in the screening process, the halftoning module 21 is configured to divide the grayscale image 30 into sixteen grayscale image cells 301, each corresponding to the predetermined threshold matrix 40 in size. That is to say, the predetermined threshold matrix 40 includes a number (m) of threshold values, and each of the grayscale image cells 301 has the number (m) of pixels. In this embodiment, the predetermined threshold matrix 40 includes 16 threshold values, and each of the grayscale image cells 301 has a size of 4*4 pixels. Each of the pixels is represented by a grayscale intensity value in the range of 0 to 255, where 0 indicates the strongest intensity and 255 indicates the lowest intensity.

Afterward, each of the grayscale image cells 301 and the predetermined threshold matrix 40 are compared element by element (a process referred to as "screening"). When one element of the grayscale image cell 301 (i.e., the grayscale intensity value of the pixel) is lower than or equal to the corresponding element in the predetermined threshold matrix 40 (the grayscale threshold value) in value, a value '0' is outputted to represent a first-tone dot. Otherwise, a value '1' is outputted to represent a second-tone dot.

The outputted values from each of the grayscale image cells 301 compose an image cell 311 of the halftone image 31, and the first-tone dot and second-tone dot represented by the outputted values compose a dot pattern of the image cell 311. The dot pattern of each of the image cells 311 of the halftone image 31 has the number (m) of dots (4*4 in this embodiment). In this embodiment, the first-tone dot represents a black dot, and the second-tone dot represents a white dot.

After the screening process is completed, a halftone image 31 consisting of first-tone dots and the second-tone dots is generated. The encoding module 2 is then configured to process the halftone image 31, in order to generate a data-bearing halftone image 32.

Figure 5:
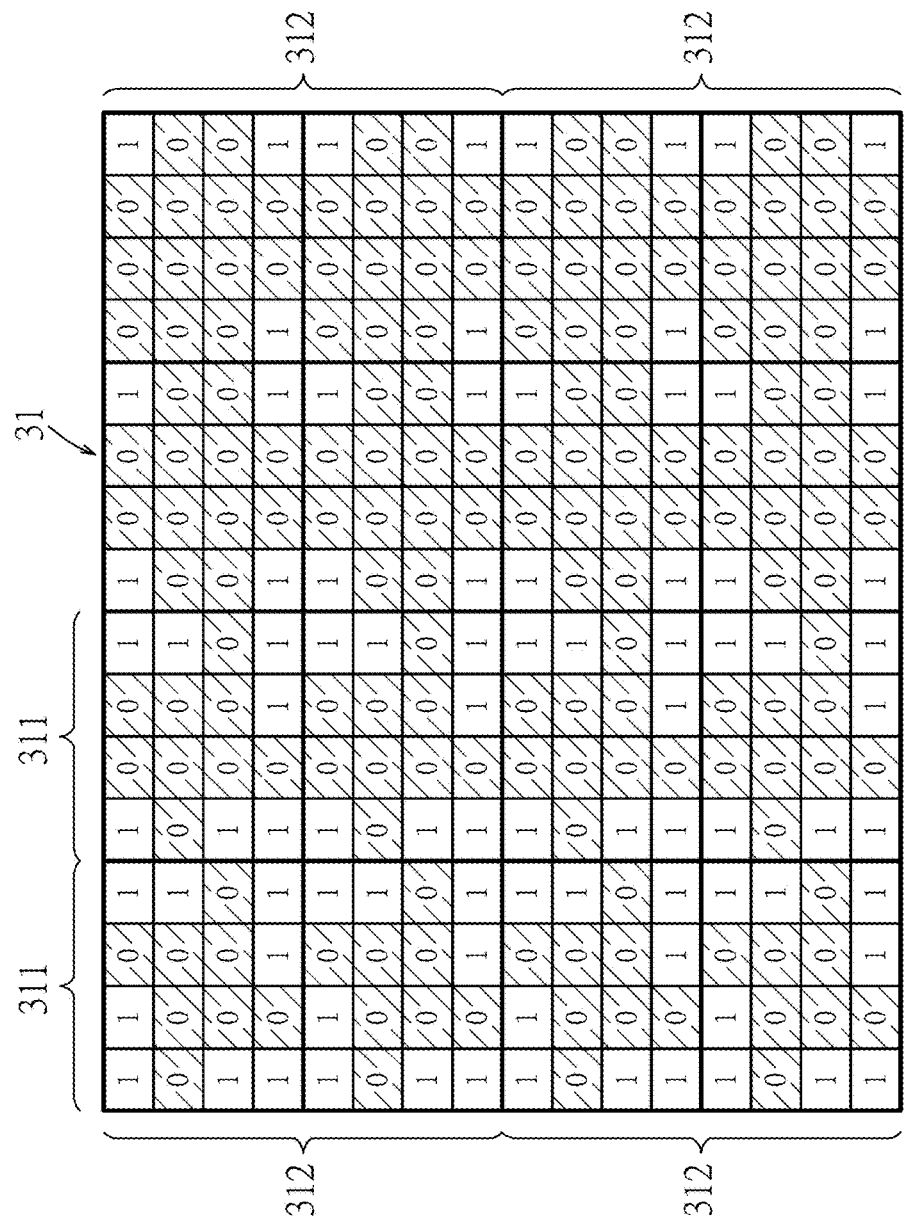
FIG. 5 illustrates an exemplary halftone image generated by the halftoning module.

Specifically, as shown in FIG. 5, the encoding module 2 defines at least one encodable block 312 that includes adjacent four of the image cells 311 of the halftone image 31. In this embodiment, the halftone image 31 includes a plurality of encodable blocks 312, each being an 8*8 square block. It is known that in other embodiments, an encodable block 312 may be in the form of a 4*16 block or a 16*4 block. In one embodiment, the positions of the encodable blocks 312 in the halftone image 31 are stored in a database (not shown in the drawings).

The encoding module 2 stores a plurality of encoding rules associated with respective codes. Specifically, in this embodiment, the encoding module 2 stores sixteen encoding rules, each associated with a distinct 4-bit code, as shown in FIG. 6. For example, when a code "0000" is to be encoded in the halftone image 31, the encoding module 2 is configured to look up the corresponding encoding rule. From FIG. 6, it is shown that an encoding rule that correspond with the code "0000" includes four numbers "0000". Those numbers are associated with a change of a number (i.e., quantity) of the first-tone dots in each of the image cells 311.

For example, for the encoding rule that corresponds with the code "0000", in encoding this code, one encodable block 312 is used, and the number of the first-tone dots in each of the four image cells 311 of the encodable block 312 is maintained. That is to say, the entire encodable block 312 is unchanged.

The encoding rule that corresponds with the code "0001" has four numbers "+1", "−1", "0", and "0". In encoding this code, another encodable block 312 is used, and for an upper-left one of the image cells 311 of the encodable block 312, the number of the first-tone dots is increased by one. Additionally, for an upper-right one of the image cells 311 of the encodable block 312, the number of the first-tone dots is decreased by one. For the other two image cells 311, the numbers of the first-tone dots are maintained.

Figure 7:
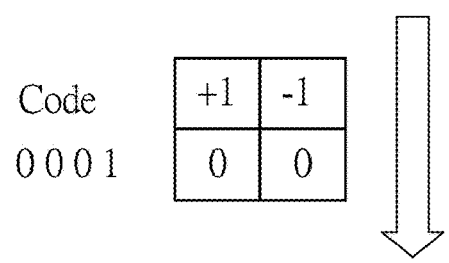
FIG. 7 illustrates an encoding action for generating a data-bearing block.

As illustrated in FIG. 7, an exemplary encodable block 312 is to be encoded with the code "0001". It is determined that the top left, top right, bottom left and bottom right image cells 311 of the exemplary encodable block 312 respectively contain eight, nine, eight, and nine first-tone dots. After applying the above encoding action according to the encoding rule that corresponds with the code "0001", a data-bearing block 313 may be generated with the top left, top right, bottom left and bottom right image cells 311 thereof respectively containing nine, eight, eight, and nine first-tone dots.

It is noted that, in this embodiment, when it is to increase the number of the first-tone dots in a particular image cell 311, one of the second-tone dots in the image cell 311 is selected, and toggled to become a first-tone dot. On the other hand, when it is to decrease the number of the first-tone dots in a particular image cell 311, one of the first-tone dots in the image cell 311 is selected, and toggled to become a second-tone dot. The selection may be arbitrary.

Figure 8:
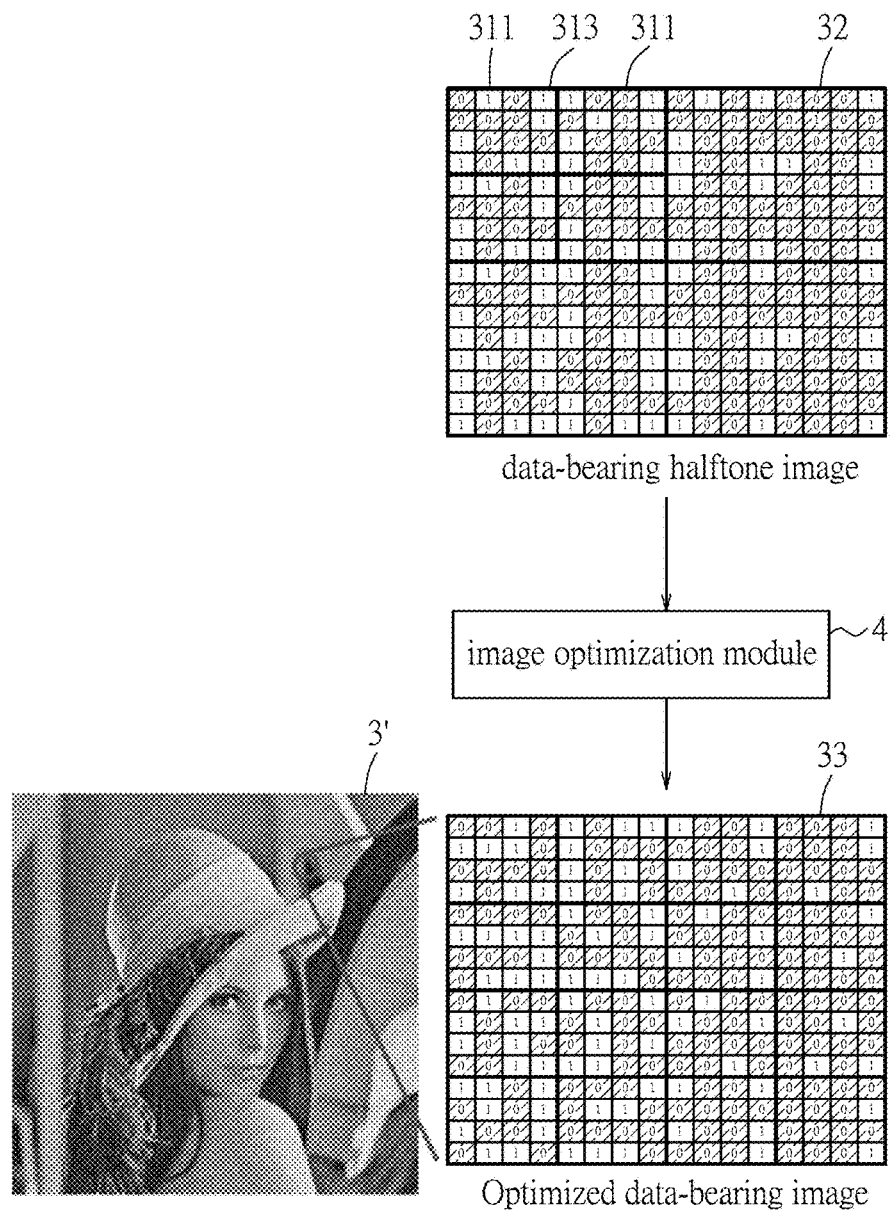
FIG. 8 illustrates operations of an image optimization module for generating an optimized data-bearing halftone image.

Applying the above procedure, the entire halftone image 31 may be encoded with a number of codes to generate a data-bearing halftone image 32 containing at least one data-bearing block 313 (see FIG. 8).

Referring to FIG. 2 and FIG. 8, the encoding system further includes an image optimization module 4. The image optimization module 4 is coupled to the encoding module 2 for receiving the data-bearing halftone image 32, and is configured to perform image optimization for each of the image cells 311 of the data-bearing halftone image 32 by utilizing techniques similar to direct binary search (DBS).

Figure 9:
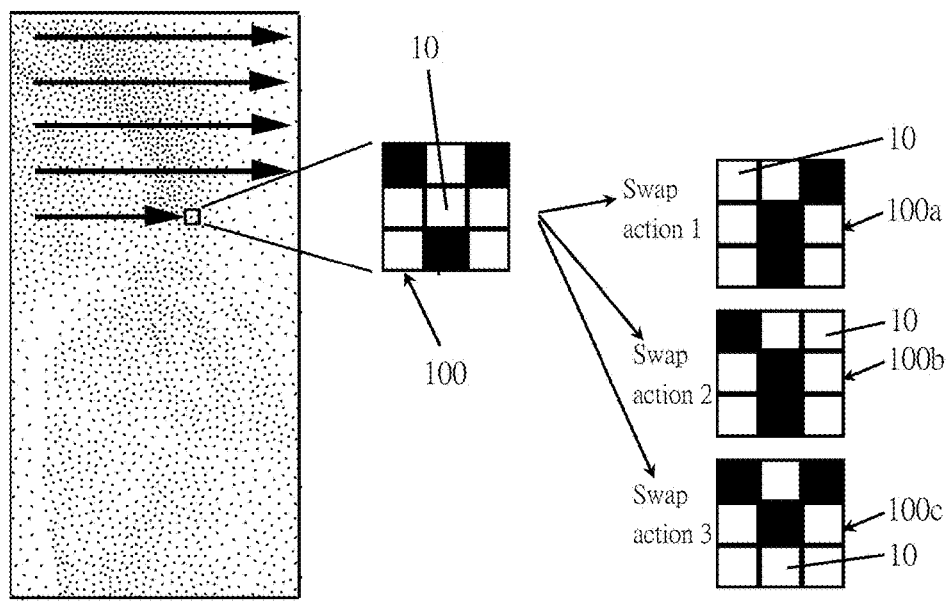
FIG. 9 illustrates the trial actions used in image optimization.

FIG. 9 illustrates how the image optimization may be implemented on an exemplary data-bearing halftone image. First, an image cell 100 of the data-bearing halftone image is selected (3*3 in this example) (hereinafter referred to as an encoded image cell). Then, a differential value between the encoded image cell and a corresponding portion of the grayscale image is calculated, and a differential value between the corresponding portion of the grayscale image and the encoded image cell after conducting each of a number of DBS trial actions with respect to a central pixel 10 thereof (the DBS trial actions result in a number of candidate image cells) is also calculated. The differential value is associated with how differently the human eye perceives the image cell and the corresponding portion of the grayscale image. This may be achieved by applying a human visual system filter kernel to both the image cell and the corresponding portion of the grayscale image.

Specifically, a trial swap action is applied to the central pixel 10 of the encoded image cell 100 (which a white dot in the example depicted in FIG. 9) by swapping the same with an adjacent dot having an opposite tone (i.e., an adjacent black dot in the depicted example). For this image cell 100, three black dots are present, and as a result three distinct trial swap actions are performed to result in three candidate image cells 100a, 100b, 100c.

For this example, four differential values are obtained, and the image cell with the lowest differential value is determined (either the encoded image cell 100 or one of the candidate image cells 100a, 100b, 100c) to serve as a corresponding optimized image cell (i.e., the difference between the optimized image cell and the corresponding portion of the grayscale image as perceived by the human eye is minimum).

Note that the DBS trial actions conventionally also include a trial toggle action. However, since a toggle action changes the number of first-tone dots in an image cell, for the purpose herein, the trial toggle action is not used.

A related document regarding the DBS technique is listed below:

F. A. Baqai and Jan P. Allebach, "Computer-aided design of clustered-dot color screens based on a human visual system model," IEEE Trans. Image Processing, Vol. 90, Issue 1, pp. 104-122, 2002. (doi:10.1109/5.982409)

Figure 10A:
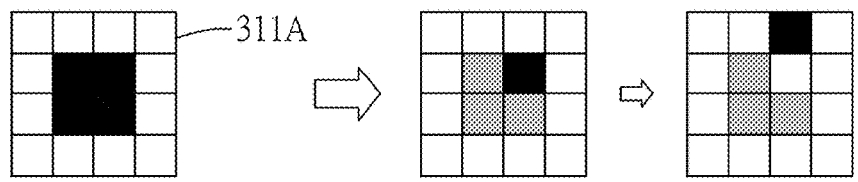
FIGS. 10A to 10C each illustrate an exemplary swap action to be applied to a first-tone dot in an image cell.
Figure 10B:
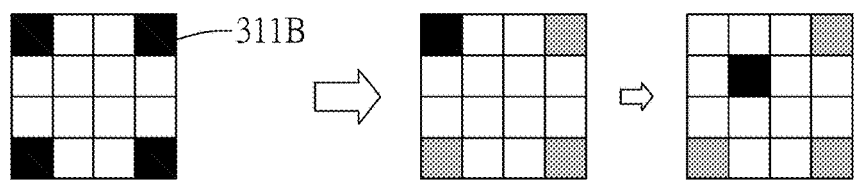
Figure 10C:
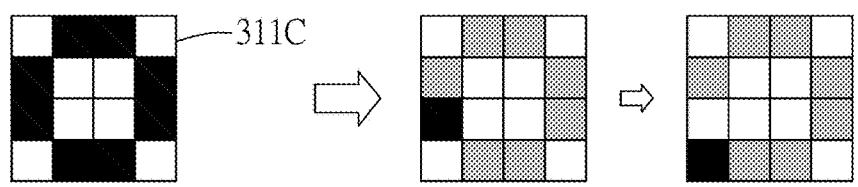

FIGS. 10A to 10C illustrate operations of the image optimization module 4 on exemplary image cells 311A to 311C.

The image cell 311A has four first-tone dots (represented in gray). For one of the first-tone dots that is marked black in FIG. 10A, the image optimization module 4 first determines a relative position of the marked one of the first-tone dots (i.e., whether the dot is located at a corner of the image cell 311A, on an edge of the image cell 311A but not at a corner, or otherwise). This is to ensure that all swap actions are performed within the image cell 311A. Since the marked one of the first-tone dots is not on an edge or at a corner, all eight adjacent dots are within the image cell 311A and among them, the second-tone dots can therefore be swapped with the marked one of the first-tone dots (one exemplary swapping is depicted). This swap action is referred to as a center swap action.

For the image cell 311B, a marked one of the first-tone dots is at a corner of the image cell 311A. As a result, only three adjacent dots may be considered for the swap action (one exemplary swapping is depicted). This swap action is referred to as a corner swap action.

For the image cell 311C, a marked one of the first-tone dots is on an edge of the image cell 311A but not at a corner. As a result, only the second-tone dots among five adjacent dots may be considered for the swap action (one exemplary swapping is depicted). This swap action is referred to as a side swap action.

As described above, for each first-tone dot in one particular image cell 311 in the data-bearing halftone image 32, the image optimization module 4 calculates a differential value between each of the image cell 311 and corresponding candidate image cell(s) and a corresponding portion of the grayscale image. Afterward, one of the image cell 311 and the candidate image cell(s) with the lowest differential value is taken by the image optimization module 4 to be the corresponding optimized image cell.

This process is iterated until an optimized image cell is determined for all image cells 311 of the data-bearing halftone image 32 to result in an optimized data-bearing halftone image 33 (see FIG. 8).

It is worth noting that in this embodiment, the image optimization module 4 performs image optimization for the image cells 311 in an order from left to right and from top to bottom of the data-bearing halftone image 32.

Figure 11:
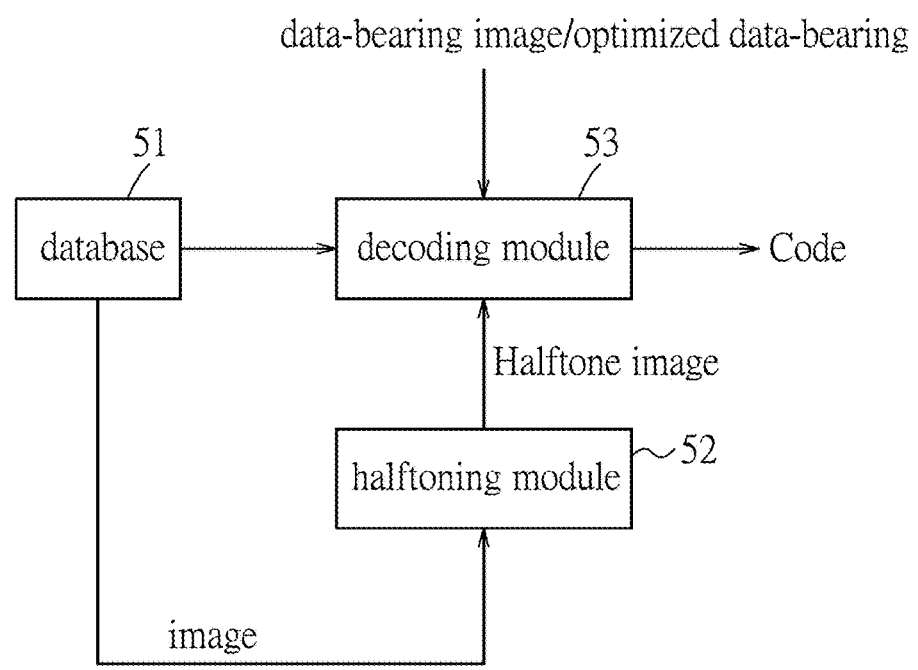
FIG. 11 is a block diagram illustrating a decoding system according to one embodiment of the disclosure.

FIG. 11 illustrates a decoding system that is configured to decode the code that is contained in the data-bearing halftone image 32 and/or the optimized data-bearing halftone image 33. In this embodiment, the optimized data-bearing halftone image 33 is to be processed.

The decoding system includes a database 51, a halftoning module 52, and a decoding module 53. In this embodiment, the decoding system may be embodied using a server computer that includes a processor, the database 51 may be embodied using a physical storage device coupled to the server computer, and the modules in the encoding system may be software applications that, when executed by the processor of the server computer, causes the processor to perform various functions that will be described below.

Figure 12:
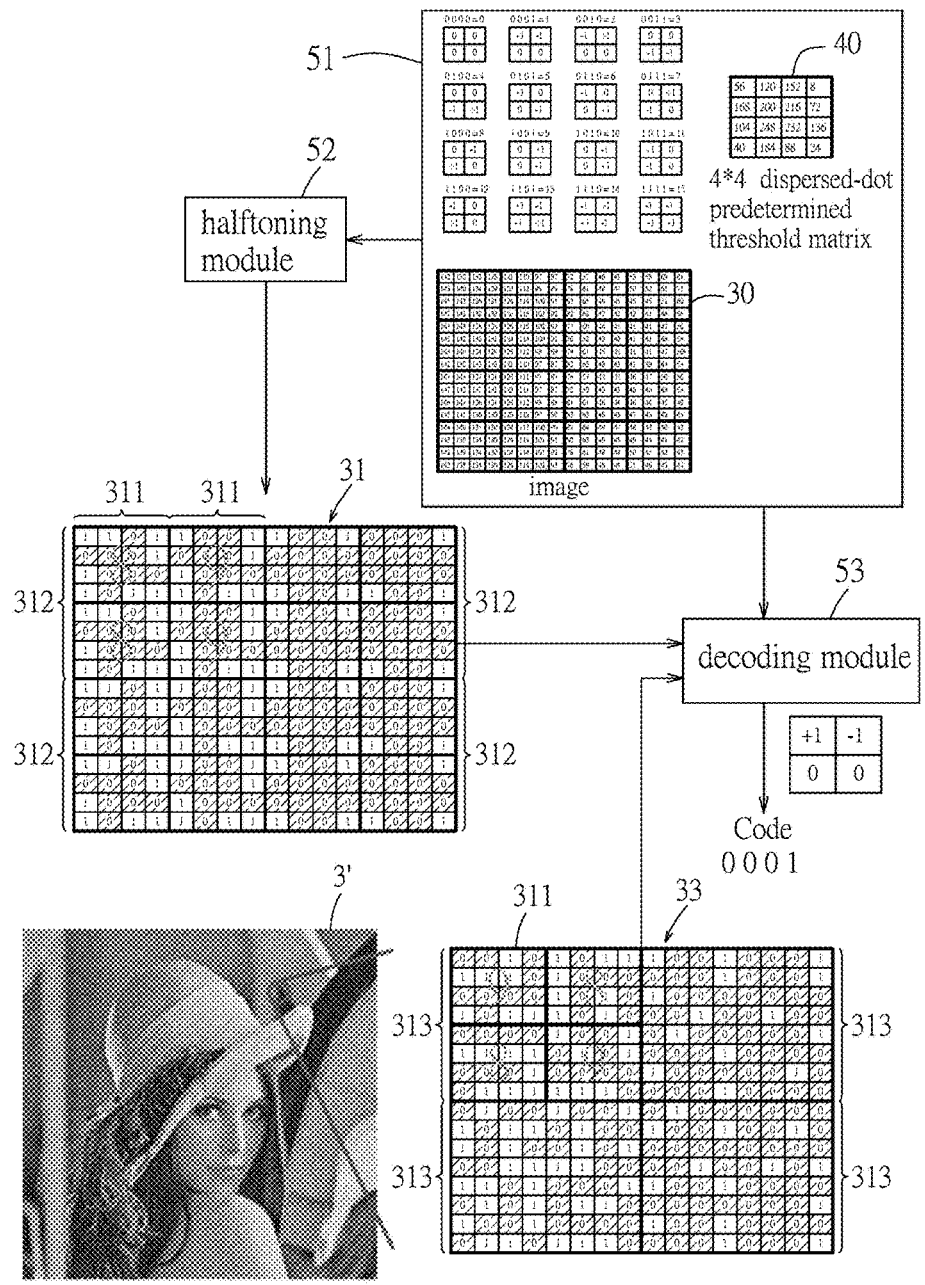
FIG. 12 illustrates operations of the decoding system according to one embodiment of the disclosure.

As shown in FIG. 12, the database 51 stores the grayscale image 30 that corresponds to the optimized data-bearing halftone image 33, the predetermined threshold matrix 40, and the plurality of encoding rules associated with respective codes. It is noted that the predetermined threshold matrix 40 stored in the database 51 has the properties identical to those of the predetermined threshold matrix 40 stored in the encoding system. That is to say, the predetermined threshold matrix 40 is a square matrix having a screen tile vector set composed of two two-dimensional vectors [0,m] and [m, 0], and has m*m grayscale threshold values. Additionally, the grayscale threshold values in the threshold matrix are generated using one of clustered-dot ordered dithering and dispersed-dot ordered dithering (dispersed-dot ordered dithering in this embodiment).

In some embodiments, the database further stores a plurality of locations of the encodable blocks 312.

In decoding the optimized data-bearing halftone image 33, the halftoning module 52 of the decoding system first converts the grayscale image 30 into the halftone image 31 in a manner similar to that of the halftoning module 1 of the encoding system. As such, the halftone image 31 has a plurality of image cells 311, each corresponding to the predetermined threshold matrix 40 in size.

Afterward, the decoding module 53 is configured to decode the data-bearing block 313 of the optimized data-bearing halftone image 33, based on the halftone image 31 and the encoding rules.

Specifically, as shown in FIG. 12, assuming that the upper-left quarter part (an 8*8 block) of the optimized data-bearing halftone image 33 is a data-bearing block 313 and the upper-left quarter part (an 8*8 block) of the halftone image 31 is an encodable block 312. In this embodiment, the location of the encodable block 312 (and in turn, data-bearing block 313) is identified by the decoding module 53 since the decoding system may include mechanisms for defining the encodable block 312 that is similar to those of the encoding module 2 of the encoding system. In other embodiments, the location of the encodable block 312/data-bearing block 313 is pre-stored in the database 51.

The decoding module 53 then calculates the number of the first-tone dots in each of the image cells 311 in the data-bearing block 313 of the optimized data-bearing halftone image 33 (nine for the top left image cell, eight for the top right image cell, eight for the bottom left image cell, and nine for the bottom right image cell), and the number of the first-tone dots in each of the image cells 311 in the corresponding encodable block 312 of the halftone image 31 (eight for the top left image cell, nine for the top right image cell, eight for the bottom left image cell, nine for the bottom right image cell).

Afterward, the decoding module 53 is configured to determine a difference of the number of the first-tone dots between each of the image cells 311 in the data-bearing block 313 of the optimized data-bearing halftone image 33 and the corresponding image cell 311 in the corresponding encodable block 312 of the halftone image 31 (+1, −1, 0, 0). As such, the decoding module 53 is capable of determining the corresponding 4-bit code that is encoded in the data-bearing block 313 of the optimized data-bearing halftone image 33 (the code "0001").

In brief, the operations of the encoding module 2 are capable of encoding the halftone image 31 with the codes, while bringing up only minimal changes to the resultant data-bearing halftone image 33 in comparison with the halftone image 31. Specifically, for each of the image cells 311, the encoding action changes the number of the first-tone dots at most by one. For each of the encodable blocks 312, the encoding action does not alter the total number of the first-tone dots (reference may be made to the encoding rules). As a result, the data-bearing halftone image 32 thus generated has relative better quality.

Additionally, the employment of the image optimization module 4 is able to provide the optimized data-bearing halftone image 33, which is processed using a technique similar to the DBS to ensure that the outputted image is as close to the grayscale image as possible for optimal perception to the human eye.

Figure 13:
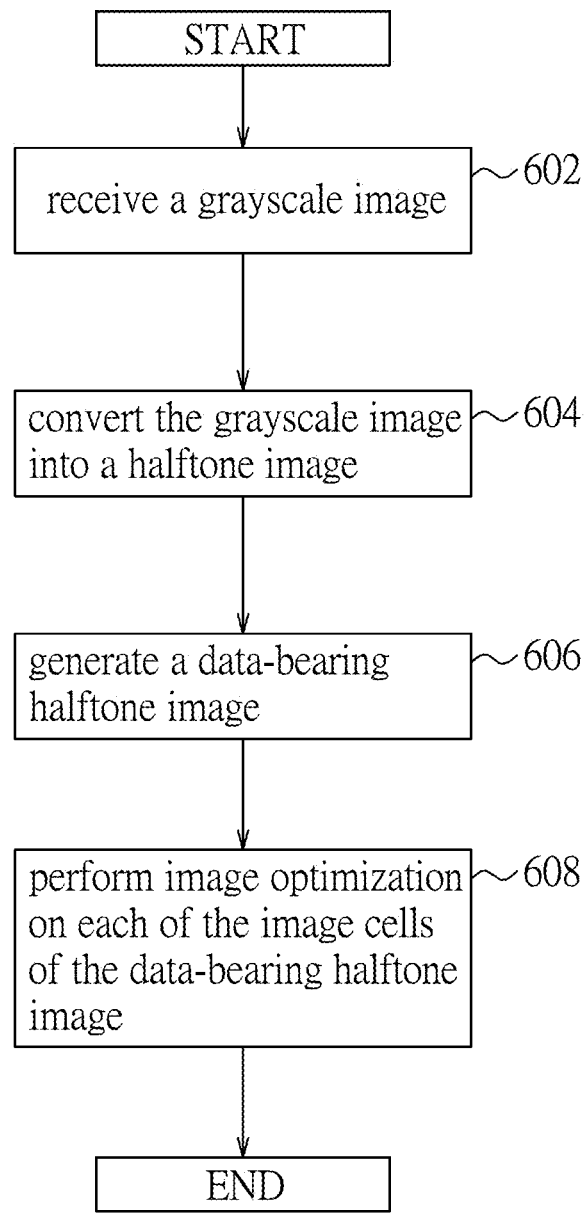
FIG. 13 is a flow chart illustrating a method for generating a data-bearing halftone image by the encoding system, according to one embodiment of the disclosure.

FIG. 13 is a flow chart illustrating a method for generating a data-bearing halftone image 32 by the encoding system, according to one embodiment of the disclosure.

In step 602, the encoding system receives a grayscale image 30.

In step 604, the halftoning module 1 converts the grayscale image 30 into a halftone image 31.

In step 606, the encoding module 2 generates a data-bearing halftone image 32.

Figure 14:
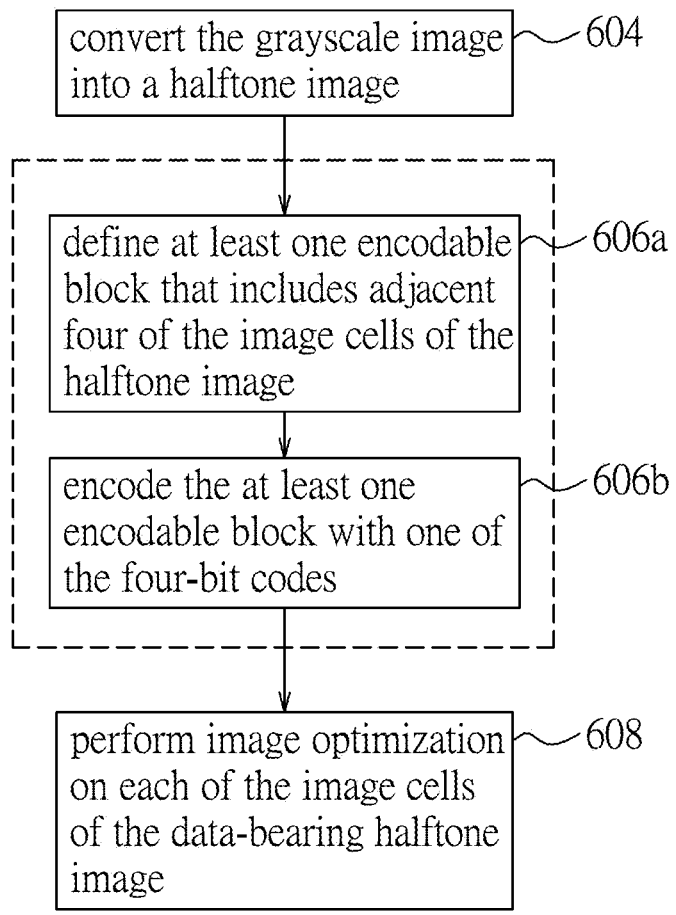
FIG. 14 is a flowchart illustrating the sub-steps for generating a data-bearing halftone image.

In particular, as shown in FIG. 14, step 606 includes the sub-steps as described below.

In sub-step 606a, the encoding module 2 defines at least one encodable block 312 that includes adjacent four of the image cells 311 of the halftone image 31.

In sub-step 606b, the encoding module 2 encodes the at least one encodable block 312 with one of the four-bit codes.

In step 608, the image optimization module 4 performs image optimization on each of the image cells 311 of the data-bearing halftone image 32.

Figure 15:
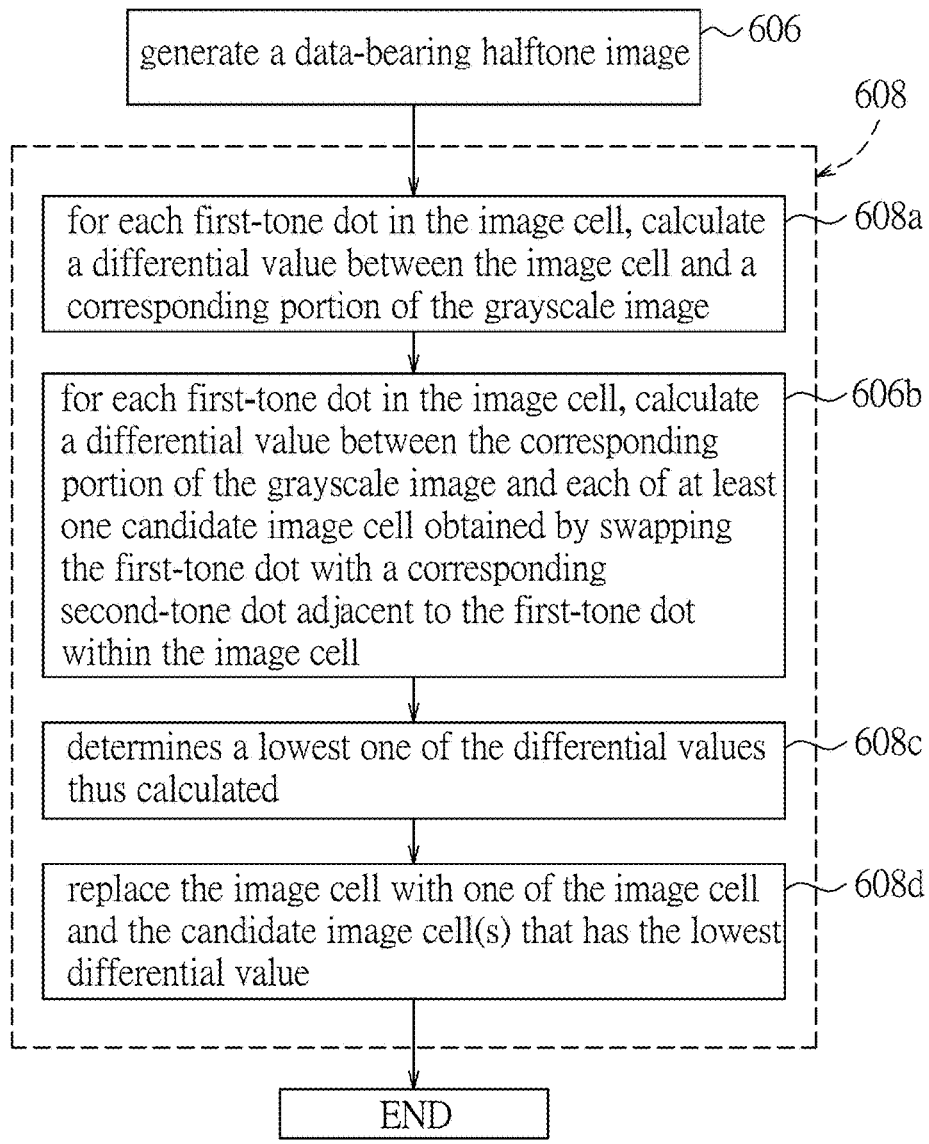
FIG. 15 is a flow chart illustrating the sub-steps for performing image optimization on each of the image cells of the data-bearing halftone image.

In particular, as shown in FIG. 15, step 608 includes the sub-steps as described below.

In step 608a, for each first-tone dot in the image cell 311, the image optimization module 4 calculates a differential value between the image cell 311 and a corresponding portion of the grayscale image 30.

In step 608b, for each first-tone dot in the image cell 311, the image optimization module 4 calculates a differential value between the corresponding portion of the grayscale image 30 and each of at least one candidate image cell that is obtained by swapping the first-tone dot with a corresponding second-tone dot adjacent to the first-tone dot within the image cell 311.

In step 608c, the image optimization module 4 determines a lowest one of the differential values thus calculated.

In step 608d, the image optimization module 4 replaces the image cell 311 with one of the image cell and the candidate image cell(s) that has the lowest differential value.

Figure 16:
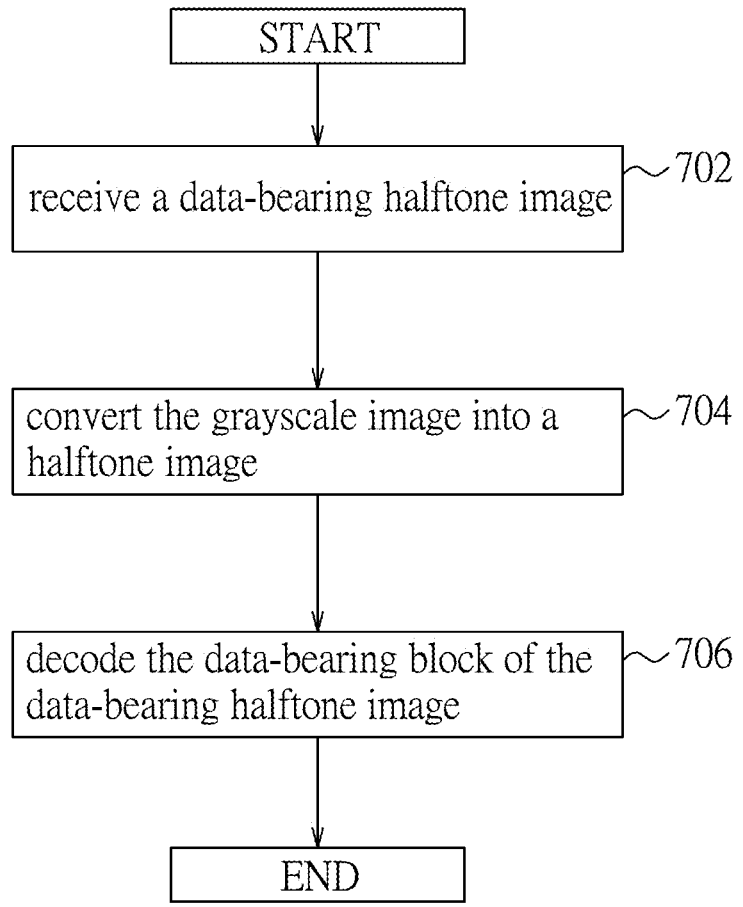
FIG. 16 is a flow chart illustrating a method for decoding a data-bearing halftone image by the decoding system, according to one embodiment of the disclosure.

FIG. 16 is a flow chart illustrating a method for decoding a data-bearing halftone image 32 by the decoding system, according to one embodiment of the disclosure.

In step 702, the decoding system receives a data-bearing halftone image 32.

In step 704, the halftoning module 52 converts the grayscale image 30 into a halftone image 31.

In step 706, the decoding module 53 decodes the data-bearing block 313 of the data-bearing halftone image 32.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for generating a data-bearing halftone image, the method to be implemented by an encoding system that includes a halftoning module and an encoding module that stores a plurality of encoding rules associated with respective codes therein, the encoding module storing sixteen of the encoding rules associated respectively with sixteen four-bit codes, the method comprising the steps of:

converting, by the halftoning module, a grayscale image into a halftone image by screening the grayscale image using a predetermined threshold matrix that includes a plurality of grayscale threshold values, the halftone image having a plurality of image cells each corresponding to the predetermined threshold matrix in size, each of the image cells consisting of a plurality of dots, at least one of which is a first-tone dot and each of the rest of which is a second-tone dot; and generating, by the encoding module, a data-bearing halftone image that is encoded with at least one of the codes by maintaining or changing the number of the first-tone dots in one of the image cells according to one of the encoding rules that is associated with the at least one of the codes; wherein generating the data-bearing halftone image includes:

defining at least one encodable block that includes adjacent four of the image cells of the halftone image; and encoding the at least one encodable block with one of the four-bit codes by performing an encoding action on each of the image cells included in the at least one encodable block according to one of the encoding rules that is associated with the one of the four-bit codes, the encoding action including one of increasing the number of the first-tone dots in the image cell by one, decreasing the number of the first-tone dots in the image cell by one, and maintaining the number of the first-tone dots in the image cell.

2. The method of claim 1, wherein the predetermined threshold matrix is a square matrix having a screen tile vector set composed of two two-dimensional vectors [0,m] and [m,0] and has m×m grayscale threshold values.

3. The method of claim 2, wherein the grayscale threshold values in the threshold matrix are generated using one of clustered-dot ordered dithering and dispersed-dot ordered dithering.

4. A method for generating a data-bearing halftone image, the method to be implemented by an encoding system that includes a halftoning module and an encoding module that stores a plurality of encoding rules associated with respective codes therein, the method comprising the steps of:

converting, by the halftoning module, a grayscale image into a halftone image by screening the grayscale image using a predetermined threshold matrix that includes a plurality of grayscale threshold values, the halftone image having a plurality of image cells each corresponding to the predetermined threshold matrix in size, each of the image cells consisting of a plurality of dots, at least one of which is a first-tone dot and each of the rest of which is a second-tone dot; and generating, by the encoding module, a data-bearing halftone image that is encoded with at least one of the codes by maintaining or changing the number of the first-tone dots in one of the image cells according to one of the encoding rules that is associated with the at least one of the codes;

the encoding system further including an image optimization module, the method further comprising the step of performing image optimization on each of the image cells of the data-bearing halftone image by:

for each first-tone dot in the image cell, calculating a differential value between the image cell and a corresponding portion of the grayscale image;

for each first-tone dot in the image cell, calculating a differential value between the corresponding portion of the grayscale image and each of at least one candidate image cell that is obtained by swapping the first-tone dot with a corresponding second-tone dot adjacent to the first-tone dot within the image cell;

determining a lowest one of the differential values thus calculated; and replacing the image cell with one of the image cell and the candidate image cell(s) that has the lowest differential value.

5. The method of claim 4, wherein the image optimization is performed for each of the image cells in an order from left to right and from top to bottom.

6. A method for generating a data-bearing halftone image, the method to be implemented by an encoding system that includes a halftoning module and an encoding module that stores a plurality of encoding rules associated with respective codes therein, the method comprising the steps of:

converting, by the halftoning module, a grayscale image into a halftone image by screening the grayscale image using a predetermined threshold matrix that includes a plurality of grayscale threshold values, the halftone image having a plurality of image cells each corresponding to the predetermined threshold matrix in size, each of the image cells consisting of a plurality of dots, at least one of which is a first-tone dot and each of the rest of which is a second-tone dot; and generating, by the encoding module, a data-bearing halftone image that is encoded with at least one of the codes by maintaining or changing the number of the first-tone dots in one of the image cells according to one of the encoding rules that is associated with the at least one of the codes, wherein:

in increasing the number of the first-tone dots in the image cell by one, one of the second-tone dots is randomly selected and converted into a first-tone dot; and in decreasing the number of the first-tone dots in the image cell by one, one of the first-tone dots is randomly selected and converted into a second-tone dot.

\* \* \* \* \*